(12) United States Patent
Zeng et al.

(10) Patent No.: US 10,839,843 B1
(45) Date of Patent: Nov. 17, 2020

(54) TD DETECTION WITH ENHANCED HDIS SIGNAL

(71) Applicants: SAE Magnetics (H.K.) Ltd., Shatin (HK); Headway Technologies, Inc., Milpitas, CA (US)

(72) Inventors: Qinghua Zeng, Fremont, CA (US); Soramany Ka, San Jose, CA (US); Ellis Cha, San Ramon, CA (US)

(73) Assignees: SAE Magnetics (H.K.) Ltd., Shatin (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/556,691

(22) Filed: Aug. 30, 2019

(51) Int. Cl.
*G11B 5/09* (2006.01)
*G11B 5/60* (2006.01)
*G11B 5/48* (2006.01)

(52) U.S. Cl.
CPC .......... *G11B 5/6076* (2013.01); *G11B 5/6052* (2013.01); *G11B 5/4826* (2013.01)

(58) Field of Classification Search
None
See application file for complete search history.

(56) References Cited

U.S. PATENT DOCUMENTS

| 8,508,876 | B2 | 8/2013 | Polley et al. | |
| 8,654,618 | B1* | 2/2014 | Liu | G11B 5/314 |
| | | | | 369/13.33 |
| 8,773,809 | B2 | 7/2014 | Jin et al. | |
| 8,908,317 | B1* | 12/2014 | Aoyagi | G11B 5/6076 |
| | | | | 360/75 |
| 2012/0002319 | A1* | 1/2012 | Kondo | G11B 5/3133 |
| | | | | 360/59 |
| 2013/0094104 | A1* | 4/2013 | Ngan | G11B 5/607 |
| | | | | 360/31 |
| 2013/0250446 | A1* | 9/2013 | Zeng | G11B 5/607 |
| | | | | 360/46 |
| 2013/0250455 | A1* | 9/2013 | Zeng | G11B 5/455 |
| | | | | 360/234.3 |
| 2014/0268386 | A1* | 9/2014 | Li | G11B 5/607 |
| | | | | 360/31 |
| 2016/0254016 | A1* | 9/2016 | Canchi | G11B 5/6076 |
| | | | | 360/75 |

\* cited by examiner

*Primary Examiner* — Peter Vincent Agustin
(74) *Attorney, Agent, or Firm* — Saile Ackerman LLC; Stephen B. Ackerman (57) ABSTRACT

A method of operating an HDD having a slider-mounted read/write head that is configured for dynamic fly-height operation (DFH) and includes at least one head-disk interference sensor (HDIs). By operating the DFH to lower the head and subjecting the HDIs signal to a power-law enhancement, a consistent and accurate determination of the touchdown power (TDP) can be obtained. Combining absolute TDP determination with a method for measuring relative changes of FH, an absolute determination of FH can be determined.

16 Claims, 8 Drawing Sheets

TD DETECTION WITH ENHANCED HDIS SIGNAL

1. TECHNICAL FIELD

This disclosure relates to magnetic write heads that write on magnetic recording media, particularly to methods of detecting when a write head makes a contact ("touchdown" or TD) with the surface of a rotating recording medium.

2. BACKGROUND

Hard disk drives (HDD) have been increasing the recording density of the magnetic disks on which data storage occurs. Correspondingly, the thin-film magnetic heads used to write and read that data have been required to improve their performance as well. The thin-film read/write heads most commonly in use are of a composite type, having a structure in which a magnetic-field detecting device, such as a giant-magnetoresistive (GMR) read sensor is used together with a magnetic recording device, such as an inductive electromagnetic coil. These two types of devices are laminated together and mounted on a rectangular solid prism-shaped device called a slider. The slider literally flies over the rotating surface of a disk while being held aloft by aerodynamic forces at a height called the fly height (FH). The read/write head is mounted in the slider where it serves to both read and write data signals, respectively, from and onto magnetic disks which are the usual magnetic recording media in a HDD.

Typically, the magnetic writer portion of the read/write head is a small electrically activated coil that induces a magnetic field in a magnetic pole. The field, in turn, emerges at a narrow write gap (WG) and can change the direction of the magnetic moments of small magnetic particles, or groups of particles, embedded in the surface of the disk. If the embedded particles are embedded in such a way that their magnetic moments are perpendicular to the disk surface and can be switched up and down relative to the plane of that surface, then you have what is called perpendicular magnetic recording (PMR). The perpendicular arrangement produces a more densely packed region for magnetic recording.

The constant and rapid increase in the recording area density of hard disk drives requires a continuous decrease in the flying height (FH) of the slider, which is the spacing between the magnetic recording head and disk. After the FH was reduced to about 10 nm, further decrease became extremely difficult to obtain. Fortunately, at about this time the thermal expansion-based technique emerged, and it made dynamic flying height (DFH) control possible. This technique requires that a heating element (heater) be embedded near the read/write element. When applying electric power to the heater, it expands thermally and causes the nearby portion of the read/write element to protrude as well. When this protrusion occurs, the vertical spacing between the head and the disk can be reduced locally during reading and writing. This technology has been widely applied in past several years. As the recording density just achieved 150 Gbit/cm2 (1 Tbit/in2), the spacing was decreased to 0.80 or 0.60 nm range.

In order to control the spacing through use of the heater, it is necessary to have a feasible way of measuring the spacing while applying the power to the heater. Relative spacing change can be calculated based on the well-known Wallace equation. However, to find out the actual spacing, a reference point is required. The reference point is usually the point where the head touches the disk, which is then defined as the zero of the spacing. The process of finding this reference point is called touch down (TD) detection. Once the reference point is found, the absolute spacing, which is the spacing relative to the reference point, can be set to a specified value. This value is typically 0.8 run for current generation of drives and it is obtained by adjusting the DFH power during reading and writing.

To obtain better TD detection as well as thermal asperity (TA) scanning and potential real time FH monitoring, the head element typically also includes a head-disk interference (HDI) sensor (HDIs). This sensor is a resistive temperature sensor used to detect a temperature change in the head that is induced by changes in clearance during head vibrations or by a direct contact caused by contact with disk asperities. The HDIs signal has DC and AC components. During and even after the slider contacts the disk, a strong high frequency (AC component) HDIs signal might appear. If the TD vibration is strong, then the AC component of the HDIs signal can be used to detect the TD. When TD vibration is weak, the AC signal might be too weak to provide a good detection, in which case the DC component might provide a better TD detection. However, in many cases, both AC and DC signals are weak, in which case TD detection with HDIs signals becomes very challenging.

In some cases, the HDIs signal is strong, but it is sensitive to the spacing between HDIs and recording media. This spacing has a large sample-to-sample variation because HDIs protrusion has a large sample-to-sample variation as a result of the slider manufacturing process. As a result, there is a large variation of the TD power detected with HDIs signals. A method is needed to enhance the HDIs signal so that it is possible to handle these two kinds of situations.

Figure 1A:
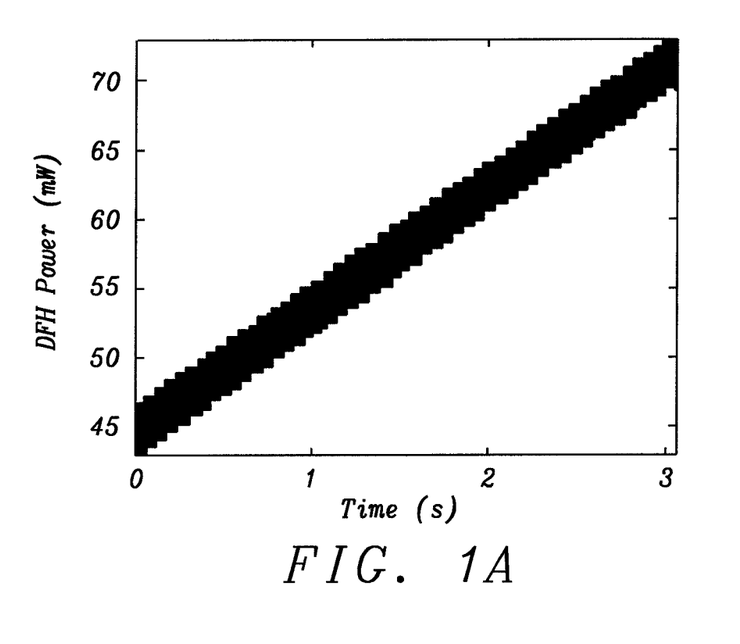
FIG. 1A is a graphical illustration of the application of DFH (dynamic flying height) power during a TD process, showing the stair-like shape of the applied power.
Figure 1B:
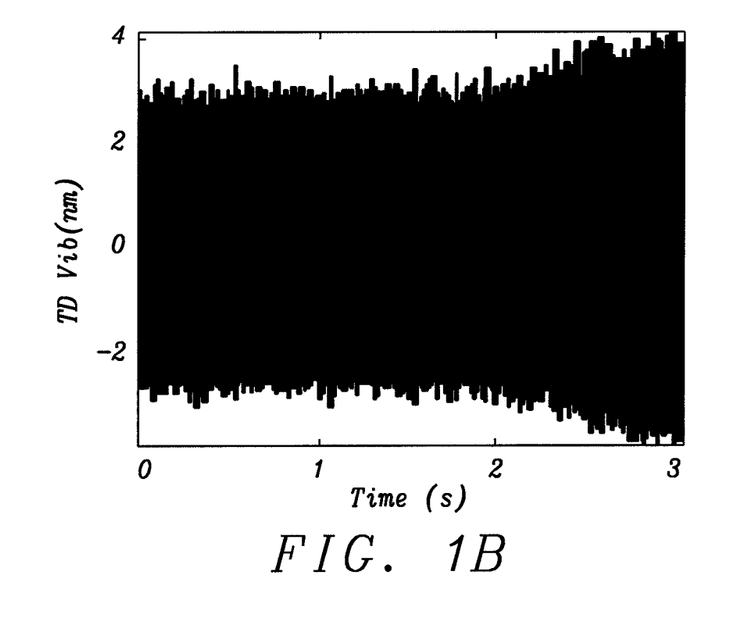
FIG. 1B is a graphical illustration showing a measurement of TD vibration using an LDV (laser doppler vibrometer) during the TD process of FIG. 1A.
Figure 9:
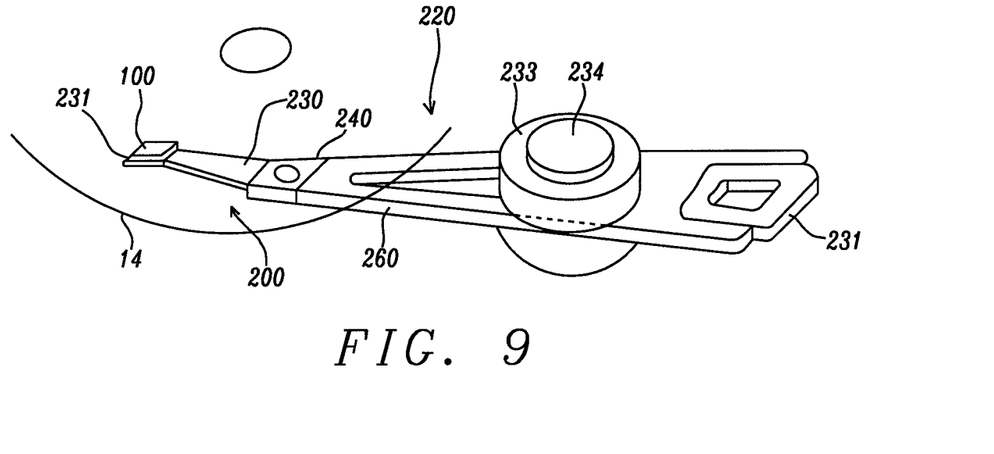
FIGS. 9, 10 and 11 are schematic illustration showing the system incorporated within the components of an operational HDD.

FIGS. 1A-1D show a complete TD process in an operational system. FIG. 1A shows a ramping up of DFH power applied to reduce the spacing between the head and the rotating medium surface. As this is occurring, FIG. 1B shows the TD vibration on the gimbal (a portion of the assembly holding the write head as illustrated in FIG. 9), measured using a laser doppler vibrometer (LDV).

Figure 1C:
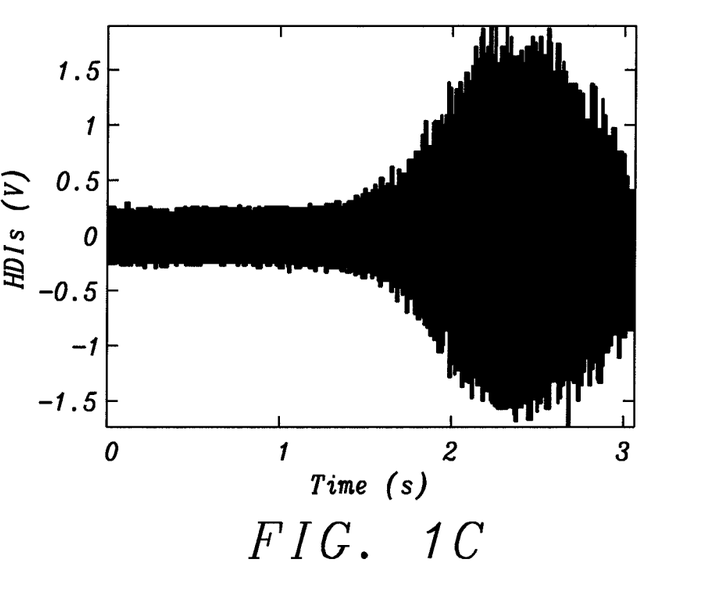
FIG. 1C is a graphical illustration showing the HDIs signal time history with a 200 mV BHV (bias voltage) during the TD process of FIG. 1A.
Figure 1D:
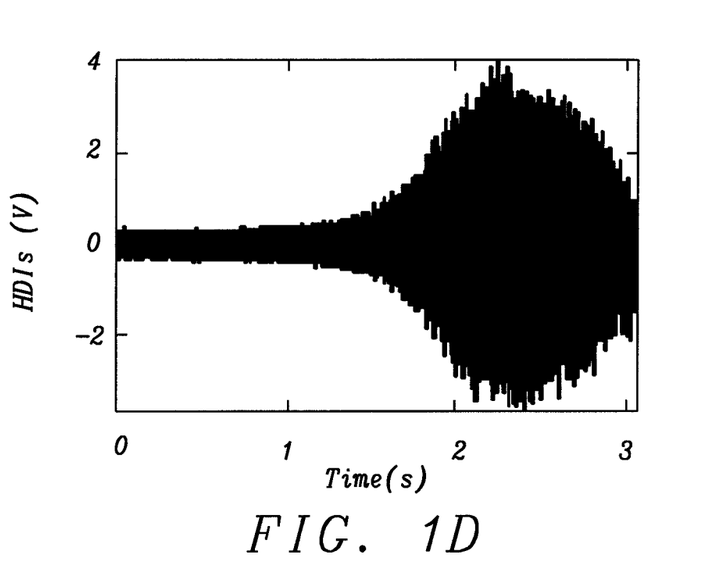
FIG. 1D is a graphical illustration showing the HDIs signal time history with a 280 mV BHV during the TD process of FIG. 1A.

FIGS. 1C and 1D show the HDIs signals captured with different bias voltages (BHV) on the HDIs detector. The different values of BHV were used to simulate the HDIs spacing variation effect.

FIGS. 1B, 1C and 1D show that as DFH power increases to bring the head closer to the rotating medium, both the TD vibration increases (1B) and HDIs signals increase (1C and 1D) at about 2.0 second or 62 mW. This indicates that a TD occurred around this point.

Figure 2:
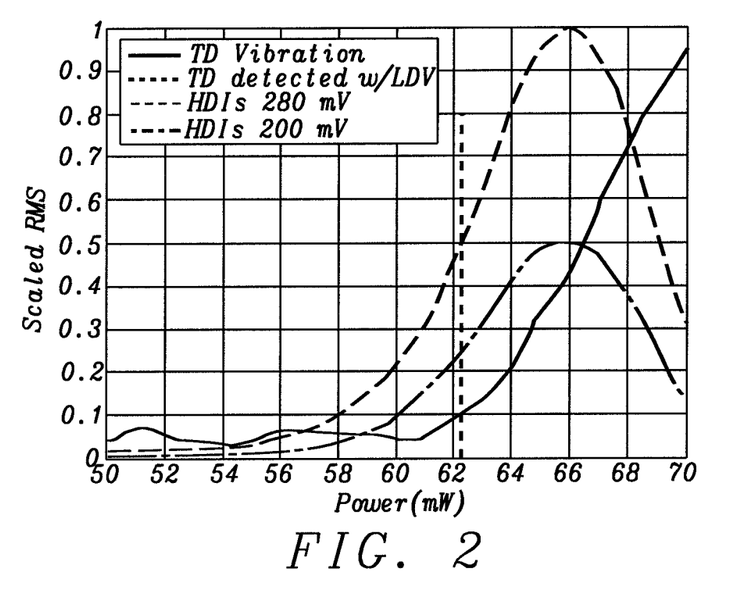
FIG. 2 is a set of graphs showing the RMS values of the TD vibration and HDIs signal of the graphs in FIGS. 1A, B, C and D.

FIG. 2 shows the RMS of TD vibration and HDIs signals. We observe that TDP (TD power) detected with TD vibration or with a LDV is about 62 mW. LDV can detect the true TD, but it can only be used in a spin-stand component test, and it cannot be used in an actual HDD. We want to use HDIs to do the TD detection in the HDD. However, in that case, it is difficult to determine the TDP from HDIs signals because they are ramping (or not sharp). If we use a threshold of 0.1 to do the detection, the detected TDP will be about 58.0 mW with the 280 mV BHV, and about 60.5 mW with the 200 mV BHV. Thus, there are two possibilities:

a) HDIs detection is different from the LDV detection, i.e., it is not a true TD power;

b) HDIs detection depends on its BHV, i.e., HDIs spacing that has a large variation. Therefore, HDIs detection is not good although HDIs signal is strong in this case.

SUMMARY

The first object of this disclosure is to provide a method of improving TD detection for a slider-mounted read/write head so that flying height can be more accurately measured and maintained during HDD operation.

A second object of this disclosure is to provide such a method that is suitable for application to TD signals that are both very strong and very weak.

A third object of the present disclosure is to provide such a method where the detected TD point is very close to the true TD point.

A fourth object of this disclosure is to provide such a method that is not sensitive to HDIs spacing so that signals from the HDIs have a smaller variation.

A fifth object of this disclosure is to provide such a method that can be implemented under a variety of experimental and operational conditions, including spin-stand tests, operational HDD use and slider head gimbal assembly (HGA) electric tests.

The above objects and others as well, will be achieved by a method that involves processing HDIs signals to enhance them so that the waveform of the signal is sufficiently well defined that the TD point can be unambiguously obtained and is the same as that determined using a detector such as a laser doppler vibrometer (LDV), which operates on a different principle.

We have demonstrated that, after the HDIs signal is enhanced using a power-law calculation (operation) as in Eq. 1 below, the RMS curves become very sharp, as shown FIG. 3. With a large value of np, detection becomes very easy and consistent.

Figure 4:
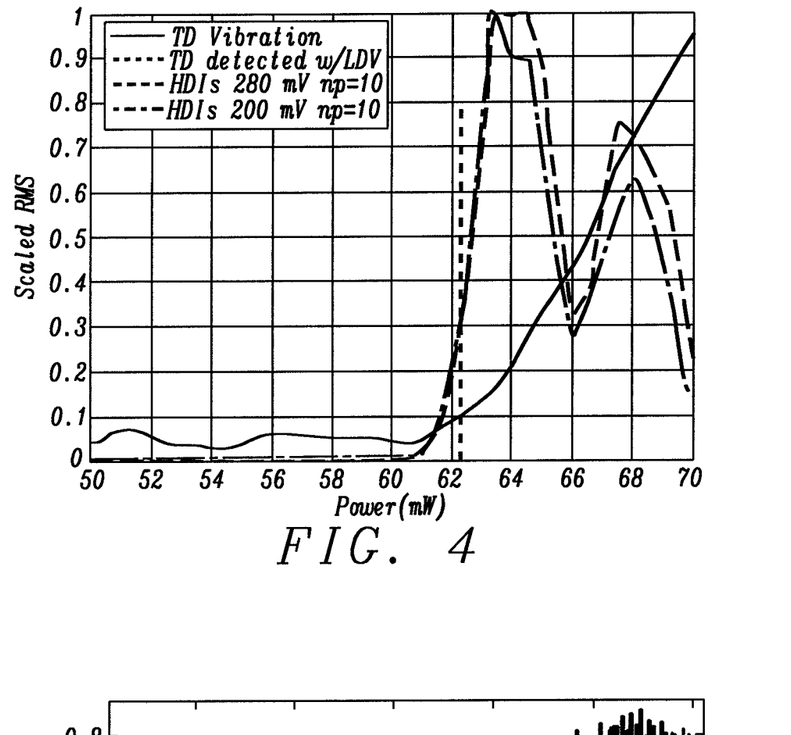
FIG. 4 is a set of graphs showing the RMS values of the TD vibration and HDIs signal with np=10.

FIG. 4 shows that with np=10, a substantially identical TDP can be found from the HDIs signal with a BHV of 280 mV or 200 mV, and it is very close to the LDV detected TDP. Therefore, detection is accurate and not sensitive to BHV or HDIs spacing variation.

Figure 5:
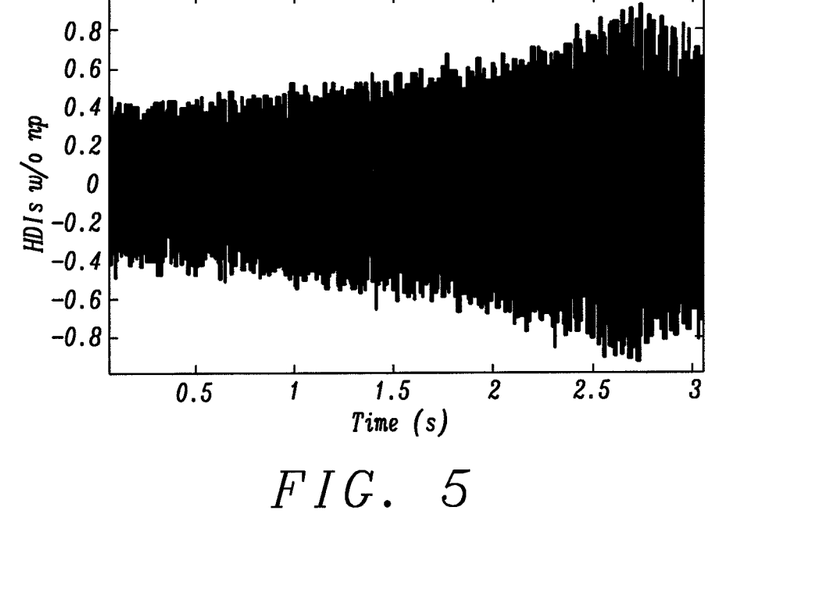
FIG. 5 is an illustration of the HDIs signal time history before power enhancement.
Figure 7:
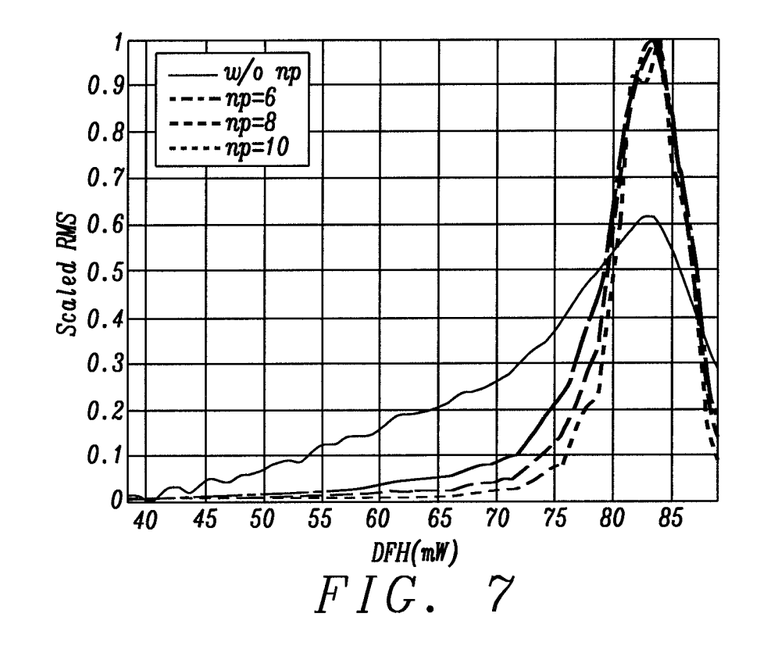
FIG. 7 is a graph of the RMS value of the HDIs signal with different np values.
Figure 8:
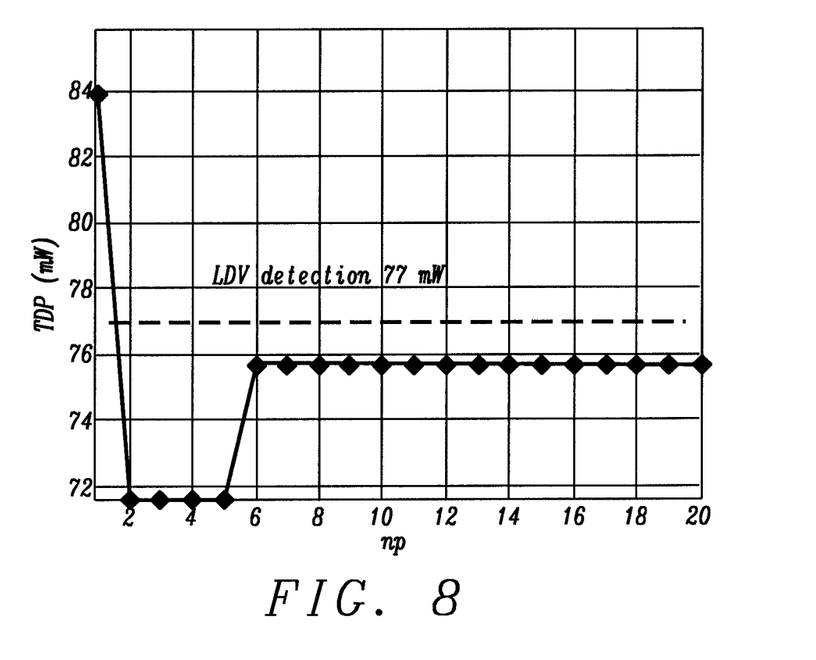
FIG. 8 is a graphical illustration of TDP (TD power) detected using HDIs with different np values.

FIG. 5 shows another case. The HDIs signal is very weak and gentle (not sharp), and it is very difficult to find TD point from the RMS plot shown in FIG. 7. However, after the HDIs enhanced with np=10, the TD signature is very clear in both time history shown in FIG. 6 and RMS curves shown in FIG. 7. Detected TDP with different np were shown in FIG. 8. In this case, when np>=6, the detected TDP is consistent and very close to the LDV detection. The method is as follows.

We begin with a slider-mounted DFH-configured, read/write head operationally installed in a system such as a HDD or a spin stand where the read/write head is made to approach the surface of a rotating recording medium by supplying energy to the DFH mechanism. The slider-mounted read/write head includes at least one head/disk interference sensor (HDIs) and associated electronic equipment for receiving and processing signals generated by said HDIs. The slider-mounted read/write head also includes a DFH apparatus that can effectively change the vertical distance between the slider-mounted read/write head and the surface of the rotating recording medium. The HDIs generates a signal as power is applied to the DFH apparatus and the slider-mounted read/write head approaches the surface of said rotating recording medium. However, unlike prior art methodologies, the HDIs signal is processed and enhanced as the approach to TD occurs by transforming the HDIs signal, x(t), to y(t), which is an enhanced version, specifically, y(t)=(abs(x(t)))^np, np=1, 2, ..., where the absolute value of x(t), abs((x(t)) is exponentially raised to an integer power, np, and amplified and filtered as necessary. This process makes locating the TD a more exact and reproducible process and a process that is consistent with other methods of locating the TD point.

DETAILED DESCRIPTION

The presently disclosed method begins with the use of a slider-mounted read/write head (the head) configured for dynamic fly height (DFH) operation, with the head possessing at least one HDIs (head-disk interference sensor). The head is operationally installed in a hard disk drive (HDD) or spin-stand wherein it is allowed to approach the surface of a disk by applying power to the DFH apparatus and whereby the HDIs produces a signal indicating the closeness of the approach.

In the present method, however, the HDIs signal is enhanced by being first subjected to a processing step that raises its absolute value to an integer power. It will be demonstrated in the following that the processed signal provides a more accurate and reproducible indication of the approach than does an unprocessed signal. Assuming the unprocessed HDIs signal, as a function of time, t, is denoted x(t), the enhancement transformation y(t), which is a power-law operation, is applied to it as follows:

$$y(t)=(\text{abs}(x(t)))\char`\^ np, \quad np=2,3,\ldots, \tag{1}$$

where y(t) is the enhanced HDIs signal, abs(x(t)) is the absolute value of the signal, np is a positive integer, np=1, 2, ..., and y(t) is given by equ. (1) above, where (abs(x(t)))^np is the exponentiation of the absolute value of x(t) to the integer power np.

The following brief example will show how the method is applied:

The typical measured HDIs AC signal includes two portions: noise and a slider/disk contact signal (or TD signal). If there are n measurement points in a complete disk revolution and if the slider contacts the disk at point i (the slider/disk contact usually starts at a local point), then the measured AC signal will be:

noise(1), noise(2), noise(i)+TD signal(i), noise(+1), . . . , noise(n). If we set np=2 in Eq. 1, the transformed signal will be noise(1)^2, noise(2)^2, [noise(i)+TDsignal(i)]^2, noise(i+1)^2, . . . , noise(n)^2. Or noise(1)^2, noise(2)^2, noise(i)^2+2*noise(i)*TDsignal(i)+TDsignal(i)^2, noise(i+1)^2, . . . , noise(n)^2.

Figure 6:
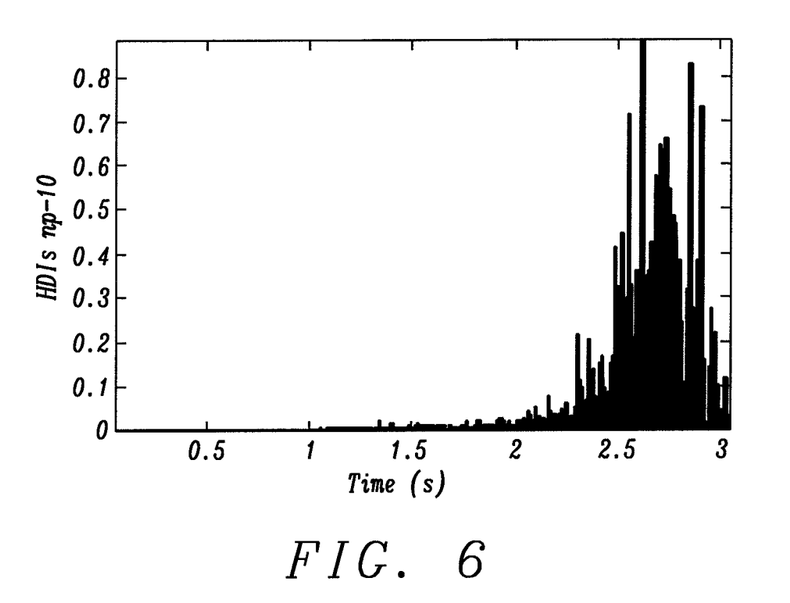
FIG. 6 is an illustration of the HDIs signal time history with np=10.

Thus, the signal at point i will be enhanced. With a large value of np, the signal will have more enhancements. That is shown in FIGS. 5 and 6.

Figure 3:
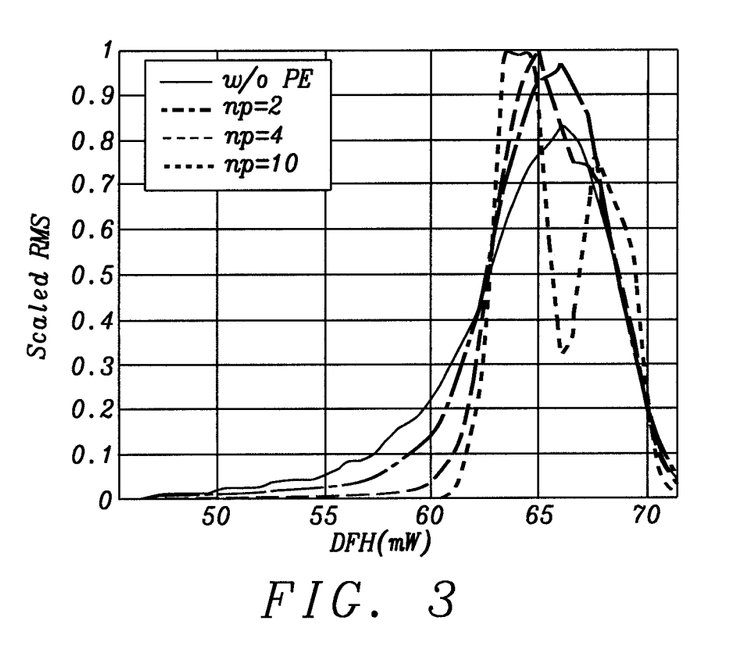
FIG. 3 is a set of graphs showing the RMS values of HDIs. With different np values (w/o PE means no signal enhancement)

The RMS of the enhanced signals will show a larger difference between before the contact and after the contact, whereby the RMS curve will have a sharper change around contact point (contact power) with a larger np, as shown in FIG. 3.

If values of np=2, 4, 6, . . . , are used, there is no need to calculate absolute value of x(t) (as is shown in Eq. 1). This is preferred, as it is easier to implement with a hardware circuit. If odd values of np=3, 5, 7, . . . , are used, the absolute value of x(t) must be calculated first, and then the power-law calculation is done.

FIGS. 1A-1D show various aspects of an entire TD process. A ramping up of DFH power was applied in FIG. 1A, and TD vibration on a gimbal (see 200 in FIG. 9 for illustration of a gimbal) was measured in FIG. 1B using a laser doppler vibrometer (LDV). HDIs signals were captured at different bias voltages (BHV), as shown in FIG. 1C (BHV=200 mV) and FIG. 1D (BHV=280 mV). The different BHV values were used to simulate a spacing variation effect of the HDIs.

As can be seen in the figures, as DFH power increases, both TD vibration increases (FIG. 1B) and HDIs signals increase until about 2.0 seconds or 62 mW (FIGS. 1C and 1D). This indicates that a TD occurred at around this point in time.

FIG. 2 shows the RMS of both the TD vibrations and HDIs signals. It can be seen that the TD power (TDP) detected by TD vibration or by LDV is about 62.0 mW. Although the LDV can detect the true TD, it can only be used in a spin-stand component test and it cannot be used in the HDD. We want to use HDIs to do the TD detection in the HDD. However, it is difficult to determine the TDP from HDIs signals because they are ramping (or not sharp). If we use a threshold 0.1 for the detection, the detected TDP will be about 58.0 mW with the 280 mV BHV, and about 60.5 mW with the 200 mV BHV. Thus, there are two issues:

a) the 58.0 and 60.5 mW are different from the LDV detection (62.0 mW), or they are not the true TD power;

b) the results depend on BHV, i.e., HDIs spacing that has a large variation.

Therefore, HDIs detection is not good, even though the HDIs signal is strong in this case. However, when we enhanced the HDIs with a power-law calculation (operation) shown in Eq. 1, the RMS curves become very sharp, as shown in FIG. 3. Using a large value of np in Eq. 1, detection becomes very easy and consistent.

FIG. 4, which graphs the results of several different np values, shows that with np=10, an identical TDP can be found when using the HDIs signal with a BHV of 280 mV or 200 mV, and the value is very close to LDV detected TDP. Therefore, detection is accurate and not sensitive to BHV or HDIs spacing variation.

FIG. 5 shows another case. Here, the HDIs signal is very weak and smooth (not sharp) as compared to FIGS. 1C and 1D, and it is very difficult to find the TD point from the RMS plot shown in FIG. 7. However, after the HDIs signal is enhanced with np=10 in Eq. 1, the TD signature is very clear in both time history shown in FIG. 6 and RMS curves shown in FIG. 7. Detected TDP with different values of np are shown FIG. 8. In this case, when np>6, detected TDP is consistent and very close to the LDV detection.

Figure 10:
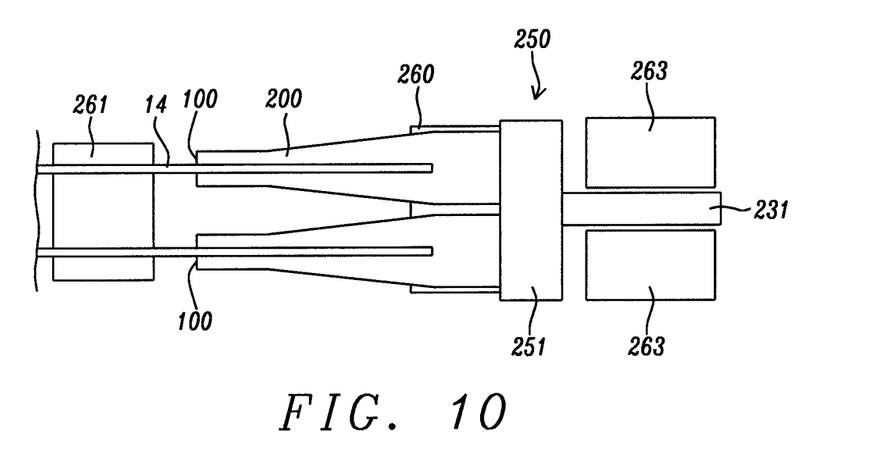
Figure 11:
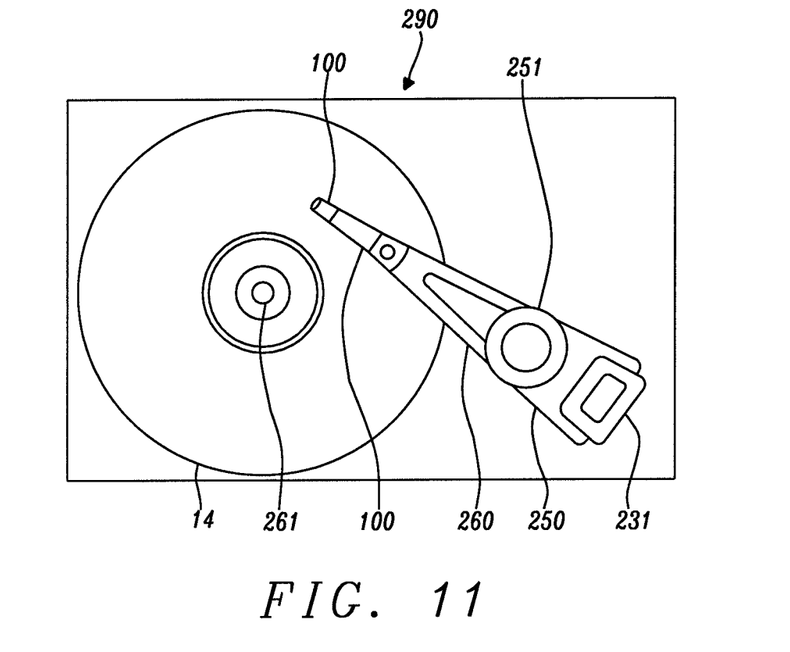

Referring finally to FIGS. 9, 10 and 11, there is shown an exemplary magnetic recording apparatus, such as a PMR configured hard disk drive (HDD), through whose use a PMR read/write head configured for DFH operation described above will meet the objects of this disclosure.

FIG. 9 shows a head gimbal assembly (HGA) 200 that includes a slider-mounted PMR read/write head 100 configured for DFH operation and having at least one HDIs. A suspension 220 elastically supports the head 100. The suspension 220 has a spring-like load beam 230 made with a thin, corrosion-free elastic material like stainless steel. A flexure 231 is provided at a distal end of the load beam and a base-plate 240 is provided at the proximal end. The head 100 is attached to the load beam 230 at the flexure 230 which provides the read/write head with the proper amount of freedom of motion. A gimbal part for maintaining the read/write head at a proper level is provided in a portion of the flexure 230 to which the read/write head 100 is mounted.

A member to which the HGA 200 is mounted to arm 260 is referred to as head arm assembly 220. The arm 260 moves the read/write head 100 in the cross-track direction y across the medium 14 (here, a hard disk). One end of the arm 260 is mounted to the base plate 240. A coil 231 to be a part of a voice coil motor is mounted to the other end of the arm 260. A bearing part 233 is provided to the intermediate portion of the arm 260. The arm 260 is rotatably supported by a shaft 234 mounted to the bearing part 233. The arm 260 and the voice coil motor (not shown) that drives the arm 260 configure an actuator.

Referring next to FIG. 10 and FIG. 11, there is shown a head stack assembly and a magnetic recording apparatus in which the slider-mounted read/write head 100 is contained. The head stack assembly is an element to which the HGA 200 is mounted to arms of a carriage having a plurality of arms. FIG. 10 is a side view of this assembly and FIG. 11 is a plan view of the entire magnetic recording apparatus.

A head stack assembly 250 has a carriage 251 having a plurality of arms 260. The HGA 200 is mounted to each arm 260 at intervals to be aligned in the vertical direction. A coil 231 (see FIG. 9), which is to be a portion of a voice coil motor is mounted at the opposite portion of the arm 260 in the carriage 251. The voice coil motor has a permanent magnet 263 arranged at an opposite location across the coil 231.

Referring finally to FIG. 11, the head stack assembly 250 is shown incorporated into a magnetic recording apparatus 290. The magnetic recording apparatus 290 has a plurality of magnetic recording media 14 mounted on a spindle motor 261. Each individual recording media 14 has two PMR elements 100 arranged opposite to each other across the magnetic recording media 14 (shown clearly in FIG. 10). The head stack assembly 250 and the actuator (except for the read/write head itself) act as a positioning device and support the PMR heads 100. They also position the PMR heads correctly opposite the media surface in response to electronic signals. The read/write head records information onto the surface of the magnetic media by means of the magnetic pole contained therein.

We wish to point out here that the present method of determining TD's can be applied not only to an operational HDD, but also to the fabrication and testing of HDD components such as the head gimbal assembly (HGA) described above. Moreover, it can also be applied in electric or dynamics electric test (ET, or DET) during manufacturing of HDD components (slider and/or HGA, head-gimbal assembly). During ET or DET, TD detection is required, and the present method should be very helpful also.

As is understood by a person skilled in the art, the present description is illustrative of the present disclosure rather than limiting of the present disclosure. Revisions and modifications may be made to methods, materials, structures and dimensions employed in operating a HDD-mounted slider configured for DFH recording that uses processed signals from an HDIs to ensure that accurate FH measurements of HDIs can be taken during TDs while still operating such a device in accord with the spirit and scope of the present disclosure as defined by the appended claims.

What is claimed is:

1. A method for operating a dynamic flying height (DFH)-configured read/write head to determine a touchdown power (TDP, or TD power), comprising:
   providing a slider-mounted DFH-configured, read/write head operationally installed in a system wherein said read/write head is configured to controllably approach the surface of a rotating recording medium; wherein
   said slider-mounted DFH-configured read/write head is mounted on a slider aerodynamically configured to support said DFH-configured read/write head at a stable flying height (FH) above a rotating magnetic recording medium; wherein
   said slider-mounted read/write head includes at least one head/disk interference sensor (HDIs) and associated electronic equipment for receiving and processing signals generated by said HDIs; wherein
   said slider-mounted read/write head further includes DFH apparatus to raise and lower said slider-mounted read/write head relative to a surface of said rotating recording medium;
   generating an HDIs signal, x(t), as power is applied to said DFH apparatus and said slider-mounted read/write head approaches said surface of said rotating recording medium; then
   enhancing said HDIs signal, x(t), by applying a power-law signal processing formula to x(t) to obtain y(t): y(t)=(abs(x(t)))^np, np=2, 3, . . . , while said approach occurs; and
   determining a TDP using said enhanced signal y(t).

2. The method of claim 1 wherein said TDP provides an absolute reference point whereby a method of determining relative changes in slider height can be combined with said absolute reference point to create a method to determine a flying height (FH) of said slider-mounted read/write head.

3. The method of claim 1 wherein in said signal processing formula:

$$y(t)=(abs(x(t)))^{np}, np=2,3, \ldots,$$

np can be chosen to produce an optimal comparison with an independent measuring device.

4. The method of claim 3 wherein np is an even integer and the absolute value of x(t) is its positive value.

5. The method of claim 3 wherein said independent measuring device is a laser doppler vibrometer (LDV).

6. The method of claim 1 wherein said signal processing further includes a step of filtering, either before or after said enhancement of the signal.

7. The method of claim 1 wherein said signal processing further includes a step of signal amplification either before or after said enhancement of the signal.

8. The method of claim 1 applied to the manufacture of active HDD components, said components including a slider and/or a head gimbal assembly (HGA) and said application occurring during electric or dynamic electric test (ET, or DET) during manufacturing of said HDD components (slider and/or HGA).

9. A dynamic flying height (DFH)-configured read/write head having an absolutely determined touchdown point (TDP), comprising:
   a slider-mounted DFH-configured, read/write head operationally installed in a system wherein said read/write head is configured to controllably approach the surface of a rotating recording medium; wherein
   said slider-mounted DFH-configured read/write head is mounted on a slider aerodynamically configured to support said DFH-configured read/write head at a stable flying height (FH) above a rotating magnetic recording medium; wherein
   said slider-mounted DFH-configured read/write head comprises at least one head/disk interference sensor (HDIs) and associated electronic equipment for receiving and processing signals generated by said HDIs; wherein
   said slider-mounted read/write head further comprises a DFH apparatus configured to raise and lower said slider-mounted read/write head relative to a surface of said rotating recording medium; wherein
   said HDIs is configured to generate a signal, x(t), as power is applied to said DFH apparatus and said slider-mounted read/write head approaches said surface of said rotating recording medium; wherein
   said HDIs signal is configured to be processed and enhanced signal y(t) while said approach occurs and a TDP is determined using y(t); and
   wherein said read/write head is configured to apply the following power-law transformation to said HDIs signal x(t) to obtain y(t): y(t)=(abs(x(t)))^np, np=2, 3, . . . , .

10. The DFH-configured read/write head claim 9 wherein said TDP provides an absolute reference point wherein, by combining said absolute TDP with a method of determining relative changes in slider height a flying height (FH) of said slider-mounted read/write head is obtained.

11. The DFH-configured read/write head of claim 9 wherein in the use of the power-law signal processing formula:

$$y(t)=(abs(x(t)))^{np}, np=2,3, \ldots,$$

np can be chosen to produce an optimal comparison with an independent measuring device.

12. The DFH-configured read/write head of claim 11 wherein said independent measuring device is a laser doppler vibrometer (LDV).

13. The DFH-configured read/write head of claim 9 wherein said signal processing further includes a step of filtering, either before or after said enhancement of the signal.

14. The DFH-configured read/write head of claim 9 wherein said signal processing further includes a step of signal amplification either before or after said enhancement of the signal.

15. A head-gimbal assembly, comprising:

the DFH-configured read/write head of claim 9; a suspension that elastically supports said DFH-configured read/write head;

a flexure affixed to said suspension and a load beam having one end attached to said flexure and another end attached to a base plate.

16. A hard disk drive (HDD), comprising:

said head gimbal assembly of claim 15;

a magnetic recording medium positioned opposite to said DFH-configured read/write head;

a spindle motor that rotates and drives said magnetic recording medium;

a device that positions said DFH-configured read/write head relative to said magnetic recording medium.

* * * * *